(12) United States Patent
Cheng

(10) Patent No.: US 7,143,127 B2
(45) Date of Patent: Nov. 28, 2006

(54) SCALING METHOD BY USING SYMMETRICAL MIDDLE-POINT SLOPE CONTROL (SMSC)

(75) Inventor: Kun-Nan Cheng, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 739 days.

(21) Appl. No.: 10/342,790

(22) Filed: Jan. 14, 2003

(65) Prior Publication Data

US 2003/0195908 A1 Oct. 16, 2003

Related U.S. Application Data

(60) Provisional application No. 60/369,525, filed on Apr. 1, 2002.

(51) Int. Cl.
*G06F 7/38* (2006.01)
(52) U.S. Cl. .................... 708/290; 708/313
(58) Field of Classification Search ............. 708/290, 708/313
See application file for complete search history.

(56) References Cited

U.S. PATENT DOCUMENTS 3,789,203 A * 1/1974 Catherall et al. ........... 708/290
5,379,241 A 1/1995 Greggain
5,502,662 A 3/1996 Greggain
5,995,682 A * 11/1999 Pawlicki et al. ............ 382/300
6,539,128 B1 * 3/2003 Lee et al. .................... 382/300

* cited by examiner

*Primary Examiner*—Chuong D. Ngo
(74) *Attorney, Agent, or Firm*—J.C. Patents

(57) ABSTRACT

A method is for scaling data from a source data to a destination data, wherein a function f(x) is determined to describe the destination data, in which x is a deviation from a current reference point 0. Two source data of f(0) and f(1) with respect to the point 0 and the point 1 are used as reference data. The method is performed by setting an initial condition about a primary slope $D = f(1)-f(0)$, $f(0.5)=[f(1)+f(0)]/2$, a gain factor $G>1$, and $f'(0.5)=DG=[f(1)-f(0)]G$ The f(x) is taken by a quadratic equation of $f(x)=ax^2+bx+c$, which should pass f(0), f(1), f(0.5) and satisfy the slope of f'(0.5). Coefficients of a, b, and, c, are respectively solved in two ranges of $0 \leq x < 0.5$ and $0.5 \leq x < 1$, so as to obtain the function f(x) being about symmetric to the middle point at 0.5. The same procedure is applied for a next source data. Preferably, the function is symmetric to the middle point at (0.5, f(0.5)). Also and, a Z transformation of $Z(z)=X(x)-0.5$ is applied to reduce the calculation load by mapping the one range to the other one range.

13 Claims, 4 Drawing Sheets

DIGITALIZED POINT OR SELECTED SHAPE CONTROL POINT

SCALING METHOD BY USING SYMMETRICAL MIDDLE-POINT SLOPE CONTROL (SMSC)

CROSS-REFERENCE TO RELATED APPLICATION

This application claims the priority benefit of U.S. provisional application titled "DUAL POINTS WITH MID-POINT SYMMETICAL SLOP CONTROL (DMSSC) SCALING" filed on Apr. 1, 2002, Ser. No. 60/369,525. All disclosures of this application is incorporated herein by reference.

BACKGROUND OF THE INVENTION

1. Field of the Invention

The present invention relates to a method of data interpolation, and more particularly to a method of scaling up or down of different types of data such as graphics, image, video or audio data, and for application of polygon curve fitting in many area such as object moving tracking analysis, data analysis, a finder for objects of 2D shape or 3D surface in graphic areas.

2. Description of Related Art

Scaling is useful for operations in graphics, image, video or audio application for expanding or shrinking sample resolution and for zooming. Especially in digital display devices with fixed resolution, different kinds of source image format must be scaled to fit the resolution of the digital display.

For example, a display panel may have fixed resolution of 1024×768 pixels in XGA mode, but the source image may come from computer, video decoder, or others that the input resolution varies depending on the input modes. The input source in VGA mode (640×480 pixels) with resolution less that that of display mode XGA needs to be scaled up when it is to be displayed on the XGA panel. On the other hand, an input source in SXGA mode (1280×1024 pixels) with resolution greater than that of display mode XGA needs to be scaled down when displayed on the XGA panel. Image resizing is very important for digital display devices such as LCD. Prior art provide different well-known methods, such as Bilinear, Cubic, B-Spline, Bésier have been proposed in order to achieve a good filtering effect for scaling uses.

The Bilinear method is the most commonly used method using interpolation. Its advantages are in its simplicity and cost since only two reference points are taken. As a result, the cost of the implementation of the Bilinear method is low because computation and storage requirements are less compared with other high-order interpolation methods. However the output of the Bilinear method is blurry due to lack of sharpness from the interpolation results and is, therefore, not suitable for text image. The sharpness of the picture quality depends on curve after fitting the interpolation points. The Bilinear method takes the weighting average as the interpolation result. Consider two neighboring pixels A, B, if the interpolation point C is located between A and B with distance D (D$\leq$1) from A, then the interpolation result according to the Bilinear method is $$C = A(1-D) + BD \qquad \text{Eq. 1}$$

Cubic or B-Spline methods are the more preferred methods used in high quality scaling system with almost perfect scaling quality, but the cost is very high for computation and storage. Cubic methods usually require 4 points f(−1), f(0), f(1), and f(2) as reference. The Cubic Curve using the Hermite Method has 1 start point $P_1$, 1 end point $P_2$, 1 start point tangent-vector $R_1$, and 1 end point tangent-vector $R_2$ by the formula $$f(x) = (2x^3 - 3x^2 + 1)P_1 + (-2x^3 + 3x^2)P_2 + \qquad \text{Eq. 2}$$
$$(x^3 - 2x^2 + x)R_1 + (x^3 - x^2)R_2$$
$$= (2P_1 - 2P_2 + R_1 + R_2)x^3 + \qquad \text{Eq. 3}$$
$$(-3P_1 + 3P_2 - 2R_1 - R_2)x^2 + R_1 x + P_1$$

where $P_1 = f(0)$,
$P_2 = f(1)$
$R_1 = G_1(P_2 - P_0)/2 = G_1[f(1) - f(-1)]/2 =$ tangent-vector at P1
$R_2 = G_2(P_3 - P_1)/2 = G_2[f(2) - f(0)]/2 =$ tangent-vector at P2
$G_1$, $G_2$ are gain factors, wherein gain factor is proportional to the sharpness of the scaling result.

SUMMARY OF THE INVENTION

The present invention provides a low cost and high performance scaling algorithm based on dual points with middle point symmetrical slope control (SMSC) method for both shrinking and zooming purposes by a second order equation. The quality of the SMSC method can be compared with the Cubic or B-Spline methods, while keeping the cost approximately equal to that of the Bilinear method. The SMSC method of the present invention only requires the minimum of two reference points so that computation and storage requirements are less than that of Cubic or B-Spline methods and equal to the minimal size of Bilinear method. Each piece of destination data can be generated only with 2 source points as reference. A slope control is used to control the sharpness of the interpolation result. The interpolation curve starts from any one of a set of two neighboring source points. After the interpolation points are located by the first set of two neighboring source points, consecutive sets of two neighboring points will be taken until all the reference points are used. The slope of the middle point of the two neighboring points is used to control the interpolation curve. Different middle point slope gain G affects the scaling quality, and can be adjustment according the different scaling requirement. Also, a Z transform is applied to minimize the computing complexity.

A method for scaling data from a source data to a destination data is introduced, wherein a function f(x) is determined to describe the destination data, where x is a deviation from a current reference point 0. Two source data of f(0) and f(1) with respect to the point 0 and the point 1 are used as reference data. The method is performed by setting an initial condition with a primary slop D=f(1)−f(0), f(0.5)=[f(1)+f(0)]/2, a gain factor G>1, and f'(0.5)=DG=[f(1)−f(0)]G. The f(x) is by a quadratic equation of f(x)=ax²+bx+c, which should pass f(0), f(1), f(0.5) and satisfy the slop at f'(0.5). Coefficients of a, b, and, c, in f(x) are respectively solved in two ranges of 0$\leq$x<0.5 and 0.5$\leq$x<1, so as to obtain the function f(x) being about symmetric to the middle point at 0.5. The same procedure is applied for a next source data.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIEMENTS

The scaling principle SMSC used in the present invention is using two end points at x=0 and x=1 within the concerning region of $0 \leq x<1$. In addition, a middle point at x=0.5 is set as f(0.5)=[f(0)+f(1)]/2. The function is taken as a quadratic function $f(x)=ax^2+bx+c$, which passes the three points. Also and, a slop f'(0.5)=DG=[f(1)−f(0)]G is satisfied, wherein G is a gain factor greater than 1. After solving the coefficients of a, b, and c, the function is used to describe the scaled data. However, the function is considered with respect to the regions of $0 \leq x<0.5$ and $0.5 \leq x<1$. The two parts of the function are joined at the middle point. Preferably, the function is symmetric or substantially symmetric to the middle point. Embodiments are provided as examples for describing the features of the invention.

Figure 1:
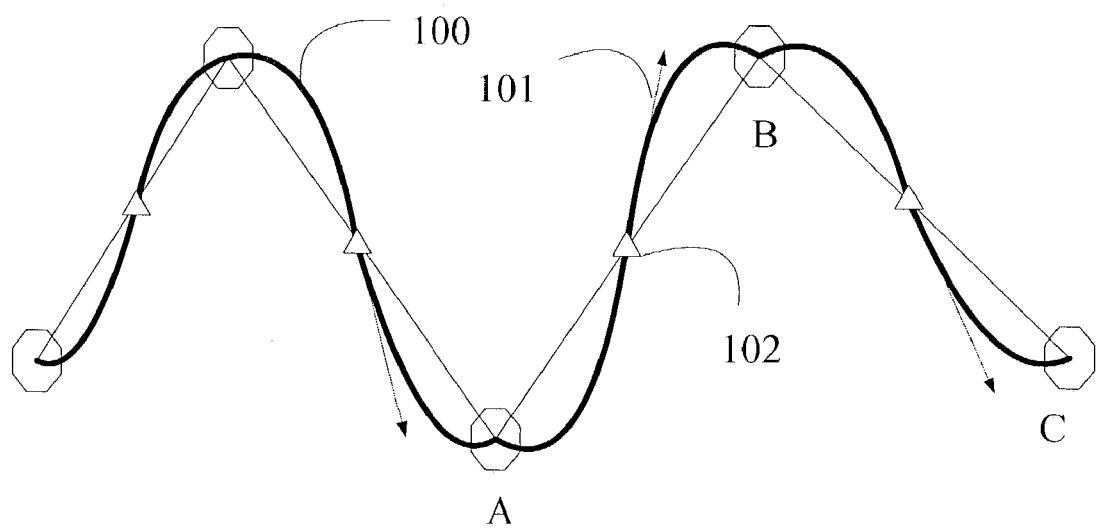
FIG. 1 is a schematic diagram illustrating the curve using the SMSC scaling method of present invention.

FIG. 1 shows a curve using the SMSC method of present invention for scaling. A curve f(x) is provided as the input source data, on which a plurality of reference source points are located. Reference number 101 indicates the slope at the point 102, where points A, B, and C are the source points. Point 102 is the middle point between A and B. The scaling function f(x) 100 within the two adjacent points should pass the two end source point A, B and the middle point. Then each part of f(x) belonging to the range of two adjacent points is joint together to form a complete scaling function for any desired point.

The advantages of the SMSC method of the invention are low-cost, simple, and less quality loss compared to other high-order (3'rd or more) interpolation methods. It uses only two samples f(0), f(1), with respect to points, i.e., A and B, to generate the scaling result but is able to produce a much sharper image than that of the Bilinear method. It is especially useful in the case when finite storage is implemented. In common applications, during vertical scaling the entire line of source image sample data must be stored in line buffer. Therefore, more source points require more storage capacity, and result in the increase of cost. The SMSC method of the present invention only requires two samples, and means that only two line buffers are needed for scaling, such as zooming or shrinking operations. The gain factor G affects the quality, where G>1 is generally considered to be good in adjusting the scaling operation into a better quality. Please note that the condition of G≠1 is not like the Bilinear method.

FIG. 1 shows the curve using the SMSC method of the present invention. The curve is symmetrical in $0 \leq x<0.5$ and $0.5 \leq x<1$. The gain factor G is important for the curve between $0 \leq x<1$. G preferably is greater than 1 for practical use. For a quadratic curve f(x), the theory employed in the present invention is as follows:

$$\text{Given } f(x)=ax^2+bx+c \qquad \text{Eq. 4}$$

$$\text{then } f'(x)=2ax+b. \qquad \text{Eq. 5}$$

If we know f(0), f(1) then the curve passes the three points of f(0), f(1), middle point f(0.5), with a middle point slope f'(0.5). So, a set of initial conditions is as follows:

$$M \text{ to be middle point}=f(0.5)=0.5[f(0)+f(1)] \qquad \text{Eq. 6}$$

$$D \text{ to be the difference of the terminal points slope}=f(1)-f(0) \qquad \text{Eq. 7}$$

G to be Gain Factor, G>1.

Typically, the slop D is a given primary slop at the middle point based on the two end points f(0) and f(1). However, the primary slop D is usually timed by a gain factor G for the actual slope f(0.5) as follows:

$$f'(0.5)=DG=D\text{Gain} \qquad \text{Eq. 8}$$

for $0 \leq x<0.5$: use f(0), D, M $$f(0)=c \qquad \text{Eq. 9}$$

$$f'(0.5)=a+b=[f(1)-f(0)]G=DG \qquad \text{Eq. 10}$$

$$f(0.5)=0.25a+0.5b+c=0.5[f(0)+f(1)]=M \qquad \text{Eq. 11}$$

for $0.5 \leq x<1$: use f(1), D, M $$f(1)=a+b+c \qquad \text{Eq. 12}$$

$$f'(0.5)=a+b=[f(1)-f(0)]G=DG \qquad \text{Eq. 13}$$

$$f(0.5)=0.25a+0.5b+c=0.5[f(0)+f(1)]=M. \qquad \text{Eq. 14}$$

Therefore, the coefficients a, b, c for f(x) are solved to describe the f(x) within the ranges of $0 \leq x<0.5$ by $$f(x)=2[DG+f(0)-f(1)]x^2+[2f(1)-2f(0)-DG]x+f(0) \qquad \text{Eq. 15}$$

for $0.5 \leq x<1$ $$f(x)=-2[DG+f(0)-f(1)]x^2+[2f(0)-2f(1)+3DG]x+[f(1)-DG]. \qquad \text{Eq. 16}$$

The cost estimation of the solution f(x) for both $0 \leq x<0.5$ and $0.5 \leq x<1$ is shown in the table 1 below. The cost is calculated based on the number of operations in the formula.

TABLE 1

| | Cost Estimation: | | | |
|---|---|---|---|---|
| Parameter | | Adder | Multiplier | Note |
| $0 \leq x < 0.5$ | DG = [f(1) − f(0)] G | 1 | 1 | f(1) − f(0) can be shared |
| | A = 2[DG − (f(1) − f(0))] | 1 | 0 | |

TABLE 1-continued

| | Parameter | Cost Estimation: Adder | Multiplier | Note |
|---|---|---|---|---|
| | b = [2f(1) − 2f(0) − DG] | 1 | 0 | |
| | c = f(0) | 0 | 0 | |
| | Total | 3 | 1 | |
| $0.5 \leq x < 1$ | DG = [f(1) − f(0)] G | 1 | 1 | f(1) − f(0) can be shared |
| | a = 2[DG − (f(1) − f(0))] | 1 | 0 | |
| | b = [2f(0) − 2f(1) + 3DG] | 2 | 0 | |
| | c = [f(1) − DG] | 1 | 0 | |
| | Total | 5 | 1 | |

The cost as shown in Table 1 is still high for $0.5 \leq x < 1$, which needs 5 adders. For further reducing the cost, a coordinate transfer skill is introduced to reduce the cost. A Z coordinate is applied, in which the relationship with X coordinate is as follows:

$$F(z) = az^2 + bz + c \quad \text{Eq. 17}$$

$$F'(z) = 2az + b; \quad \text{Eq. 18}$$

for $0 \leq x < 0.5$, and $$Z(z) = X(x) - 0.5, \quad \text{Eq. 19}$$

that is $$Z(-0.5) = X(0) \quad \text{Eq. 20}$$

$$Z(0) = X(0.5) \quad \text{Eq. 21}$$

The initial conditions for D, M, f(0), and a gain factor G are as follows:

$$F(0) = c = M = 0.5[f(0) + f(1)] \quad \text{Eq. 22}$$

$$F'(0) = b = [f(1) - f(0)]G = DG \quad \text{Eq. 23}$$

$$F(-0.5) = 0.25a - 0.5b + c = f(0). \quad \text{Eq. 24}$$

Thus $$F(z) = 2[f(0) - f(1) + DG]z^2 + (DG)z + 0.5[f(0) + f(1)] \quad \text{Eq. 25}$$

for $0.5 \leq x < 1$ $$Z(z) = X(x) - 0.5, \quad \text{Eq. 26}$$

that is $$Z(0) = X(0.5) \quad \text{Eq. 27}$$

$$Z(0.5) = X(1). \quad \text{Eq. 28}$$

The initial conditions for D, M, f(1), and a gain factor G are as follows:

$$F(0) = c = M = 0.5[f(0) + f(1)] \quad \text{Eq. 29}$$

$$F'(0) = b = [f(1) - f(0)]G = DG \quad \text{Eq. 30}$$

$$F(0.5) = 0.25a + 0.5b + c = f(1). \quad \text{Eq. 31}$$

Thus $$F(z) = 2[f(1) - f(0) - DG]z^2 + (DG)z + 0.5[f(0) + f(1)]. \quad \text{(Eq. 32)}$$

Cost Estimation with Z transform is shown in Table 2:

TABLE 2

| | Parameter | Adder | Multiplier | Note |
|---|---|---|---|---|
| Condition (A) | DG = [f(1) − f(0)]G | 1 | 1 | f(1) − f(0) can be shared |
| | a = 2[f(0) − f(1) + DG] | 1 | 0 | |
| | b = DG | 0 | 0 | |
| | c = 0.5[f(0) + f(1)] | 1 | 0 | |
| | Total | 3 | 1 | |
| Condition (B) | DC = [f/(1) − f(0)]G | 1 | 1 | f(1) − f(0) can be shared |
| | a = 2[f(1) − f(0) − DG] | 1 | 0 | |
| | b = DG | 0 | 0 | |
| | c = 0.5[f(0) + f(1)] | 1 | 0 | |
| | Total | 3 | 1 | |

By applying a simple Z transformation on the equation, the number of adders is brought down to 3 from its original 5. However, due to the fact that true color requires 3 separate R, G, B channels in a display system, this means that 3 sets of f(x) are needed. Since x denotes the position, the three sets are identical, so only one set of f(x) will be discussed. The Z transformation for conditions (A), (B) is just a bit mapping operation because 0.5 is a suitable value for implementation. For example, binary code 00000 denotes 0, code 10000 denotes 0.5, code 01000 denotes 0.25, and code 11000 denotes 0.75, etc. . . . This means that some bit mapping can solve the transformation, which reduces the number of adders.

Thus, the Z transformed SMSC Scaling method can reduce the adder count from 5 to 3 for parameters of a, b, c in calculation. The cost of the multiplier can be cut down by using a shifter (i.e. 4X, 2X, 1X, 0.5X, 0.25X), therefore the cost will only depend on the number of adders being used. This will enhance the importance of Z transform, which reduces the adder counts by a factor of ⅗.

Figure 2:
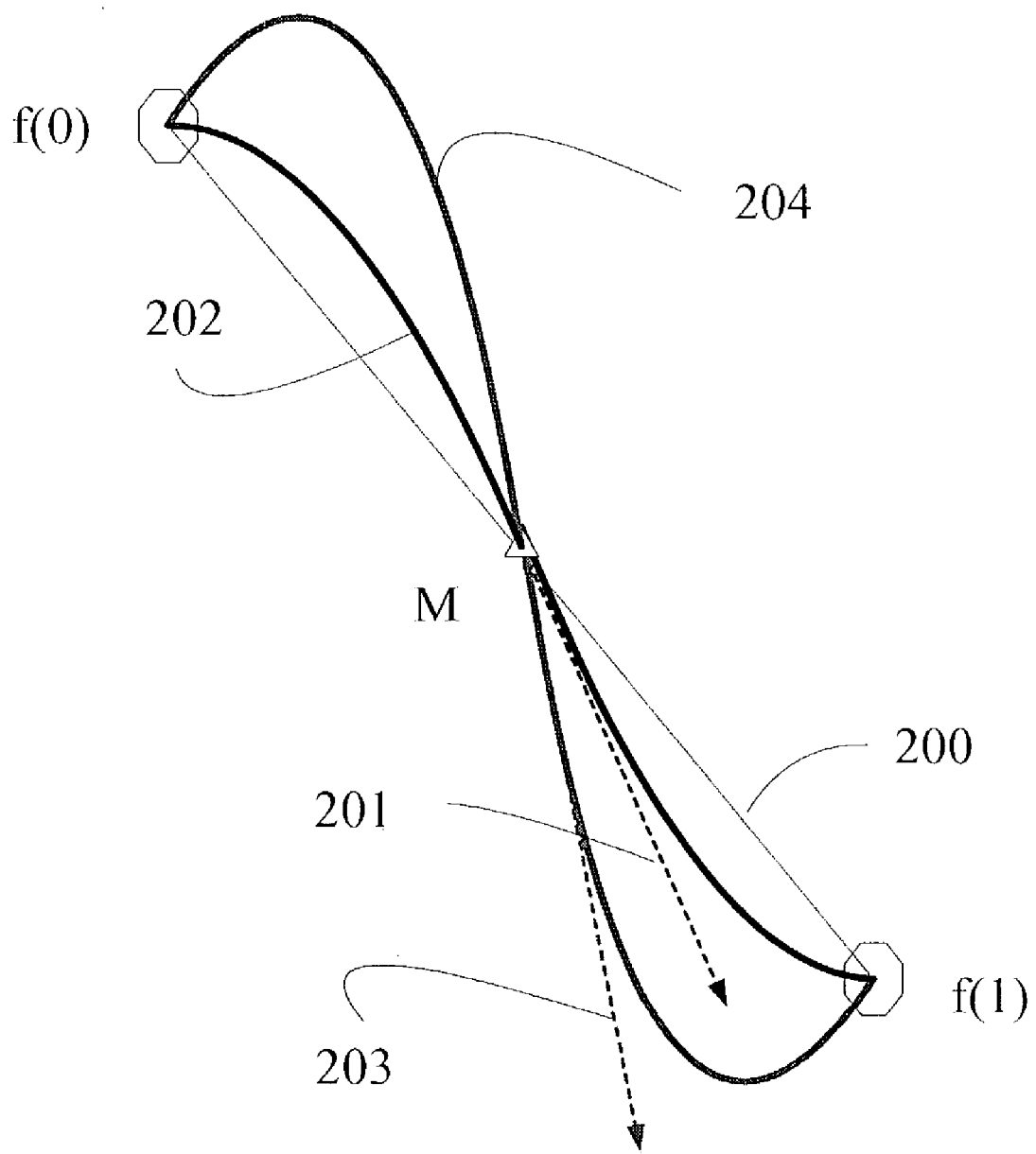
FIG. 2 is a schematic diagram illustrating the behavior using the SMSC scaling method with different gain of slope at the start source point.

FIG. 2 shows the behavior of SMSC scaling with different gain of slope at the middle point of present invention. The curve 200 is a Bilinear curve shown for comparison. The curve 202 is the curve using SMSC method with slope 201 at the middle point M, the curve 204 is the curve using SMSC method with slope 203 at the middle point M. The gain G for the slope 203 is greater than the gain G for slope 201, which produce different curves 204, 202. The gain G should be >1 and G≠1, and the slope is DG=[f(1)−f(0)]G, for $0 \leq x < 1$.

Figure 3:
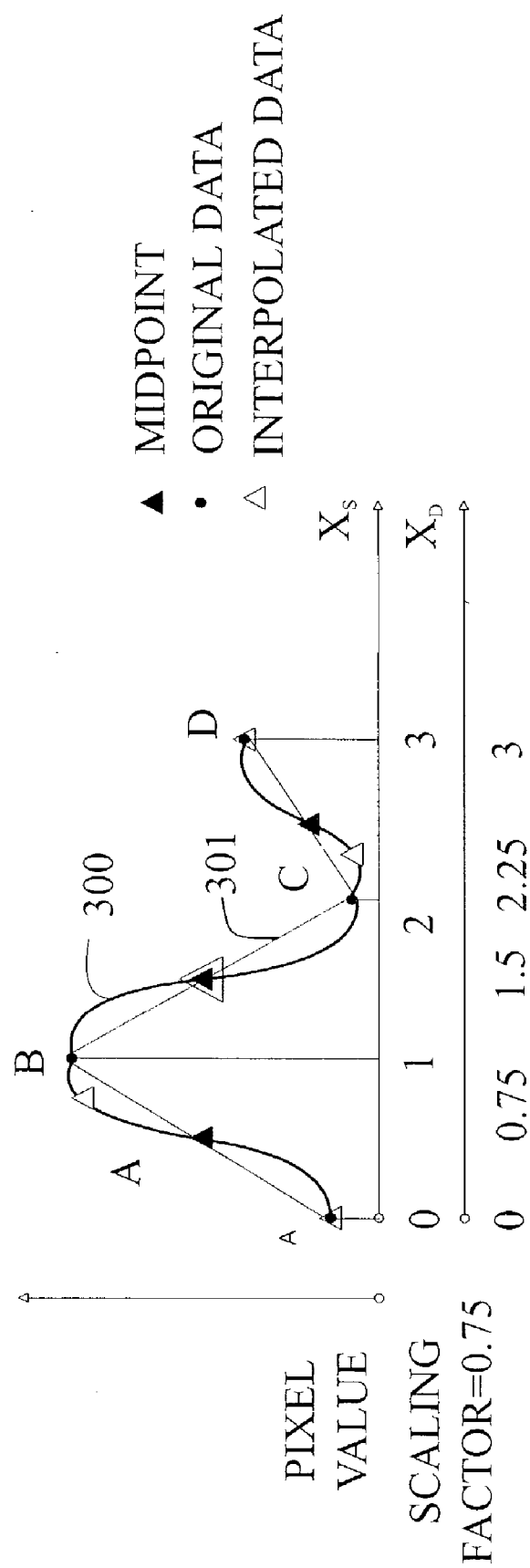
FIG. 3 is a schematic diagram illustrating the result of scaling with a scaling factor of 0.75.

FIG. 3 shows the implementation using the SMSC method of the present invention. Curve 300 is the curve using the SMSC method and curve 301 is the Bilinear curve. $X_S$ 302 is a source data location and $X_D$ 303 is the destination interpolation data location. For zoom and shrink purposes, the procedure is as follow:

a. $X_S$ denotes the position coordinate with original data $D_0$, $D_1$, $D_2$, $D_3$, . . . $D_M$ where x=0, 1, 2, 3, . . . , M;
b. A scaling factor generator generates the interpolation location $X_D$. The scaling factor is decided by (input resolution)/(output resolution), and 0.75 is used in this embodiment. Scaling factor <1 represents up scaling and scaling factor >1 represents down scaling;
c. interpolation points x locate between the coordinate x=N and x=N+1 given f(0)=$D_N$
   f(1)=$D_{N+1}$
   and x=0 . . . 01 (truncate the integer part N);
d. applying:
   for $0 \leq x < 0.5$, $f(x)=2[DG+f(0)-f(1)]x^2+[2f(1)-2f(0)-DG]x+f(0)$ for $0.5 \leq x < 1$, $f(x)=-2[DG+f(0)-f(1)]x^2+[2f(0)-2f(1)+3DG]x+[f(1)-DG]$;

e. Or applying Z transformation
   for $0 \leq x < 0.5$, $Z(z)=X(x)-0.5$ for the range x=0 . . . 0.5, change to z=−0.5 . . . 0

$F(z)=2[f(0)-f(1)+DG]z^2+(DG)z+0.5[f(0)+f(1)]$

For $0.5 \leq x < 1$, $Z(z)=X(x)-0.5$ for the range x=0.5 . . . 1, change to z=0 . . . 0.5

$F(z)=2[f(1)-f(0)-DG]z^2+(DG)z+0.5[f(0)+f(1)]$;

f. calculate the F(z) or f(x) which denotes the data after scaling or shrink at point x.

Figure 4:
FIG. 4 is a schematic diagram illustrating the application of the SMSC method on a 2D object shape of present invention.
Figure 4:
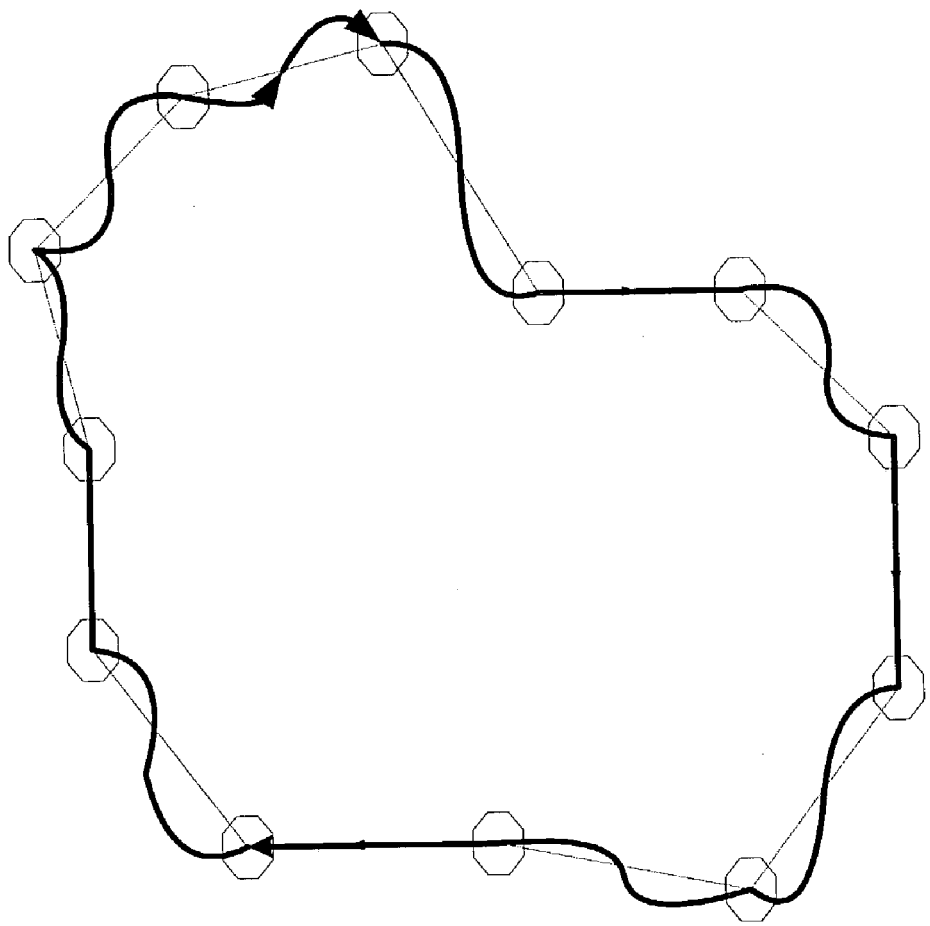

FIG. 4 is the application of the single slope SMSC curve of present invention on an object of 2D shape. The outline of any object of 2D shape can be obtained by connecting all the reference source points together. The sample points and selected shape control points form the curve 400, which is the boundary of an object of 2D shape, using the SMSC method.

The SMSC scaling method of the present invention is low cost and high performance in scaling compared to the well-known method Cubic or B-Spline method. By defining the middle point slope and gain DG, the scaling quality can be controlled and adjusted. The computation, processing, and storage requirement are only a little greater than that of Bilinear method but considerably less than that of Cubic or B-Spline methods because SMSC scaling method only requires two reference points. Furthermore, a sharper and crispier image is achieved in scaling up a source image as compared with the blurry image output using the Bilinear method. It is very important during vertical scaling that the whole line of image data must be stored as a whole in the line buffer. The more the reference points means that more line buffers are required. However, the SMSC method of the present invention only requires a minimum of 2 line buffers for 2 reference points. The present invention is excellent in many applications like in scaling of graphic, image, video, audio, or polygon curve fitting applications, moving tracking analysis, data analysis, or finder for objects of 2D shape or 3D surface in graphic areas.

The foregoing method of the invention can also be implemented into a circuit or a system to perform the scaling process, so as to reduced the computation load and cost. The scaling circuit or the scaling system can, for example, include an initial unit for setting the initial conditions, a solving unit to determine the function, and a scaling unit for scaling the source data into the desired output data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for scaling data from a source data to a destination data, implemented in a scaling device to provide the destination data in display or analysis, wherein a function f(x) is determined to describe the destination data, in which x is a deviation from a current reference point 0, and two source data of f(0) and f(1) with respect to the point 0 and the point 1 are used as reference data, the method comprising:

setting an initial condition about a primary slope D=f(1)−f(0), f(0.5)=[f(1)+f(0)]/2, a gain factor G>1, and f'(0.5)=DG=[f(1)−f(0)]G;

taking the f(x) as a quadratic equation of $f(x)=ax^2+bx+c$, which should pass f(0), f(1), f(0.5) and satisfy the slope of f'(0.5); and solving coefficients of a, b, and, c, in two ranges of $0 \leq x < 0.5$ and $0.5 \leq x < 1$, so as to obtain the function f(x) with respect to the two ranges, being symmetric or about symmetric to the middle point at 0.5, wherein the solved function f(x) based on the source data of f(0) and f(1) is used gernerate the destination data in an application unit to display or analyze.

2. The method of claim 1, wherein the function f(x) is chosen as $f(x)=2[DG+f(0)-f(1)]x^2+[2f(1)-2f(0)-DG]x+f(0)$ for $0 \leq x < 0.5$ and $f(x)=-2[DG+f(0)-f(1)]x^2+[2f(0)-2f(1)+3DG]x+[f(1)-DG]$ for $0.5 \leq x < 1$.

3. The method of claim 2, wherein the initial conditions satisfy the following relations:

for $0 \leq x < 0.5$: f(0)=c $f(0.5)=a+b=[f(1)-f(0)]G=DG$ $f(0.5)=0.25a+0.5b+c=0.5[f(0)+f(1)]=M;$ and for $0.5 \leq x < 1$ $f(1) = a+b+c$ $f'(0.5) = a+b = [f(1)-f(0)]G = DG$ $f(0.5) = 0.25a+0.5b+c = 0.5[f(0)+f(1)] = M.$

4. The method of claim 2, further comprising performing a Z transformation on the x coordinate into the z coordinate, wherein the Z transformation is $Z(z) = X(x)-0.5$, and $F(z) = 2[f(0)-f(1)+DG]z^2+(DG)z+0.5[f(0)+f(1)]$ for $-0.5 \leq z < 0$ that is, $0 \leq x < 0.5$; and $F(z) = 2[f(1)-f(0)-DG]z^2+(DG)z+0.5[f(0)+f(1)]$ for $0 \leq z < 0.5$, that is, $0.5 \leq x < 1$.

5. The method of claim 4, wherein the initial conditions satisfies:

for $-0.5 \leq z < 0$, $F(0) = c = M = 0.5[f(0)+f(1)],$ $F'(0) = b = [f(1)-f(0)]G = DG,$ $F(-0.5) = 0.25a-0.5b+c = f(0);$ for $0 \leq z < 0.5$, $F(0) = c = M = 0.5[f(0)+f(1)],$ $F'(0) = b = [f(1)-f(0)]G = DG,$ $F(0.5) = 0.25a+0.5b+c = f(1).$

6. An apparatus for scaling a plurality of source data into a plurality of output data, wherein a function f(x) is determined to describe the output data, in which x is a deviation from a current reference point 0, and two source data of f(0) and f(1) with respect to the point 0 and the point 1 are used as reference data, the apparatus comprising:

an initial circuit part, for setting up an initial condition about a primary slope $D = f(1)-f(0)$, $f(0.5) = [f(1)+f(0)]/2$, a gain factor $G > 1$, and $f'(0.5) = DG = [f(1)-f(0)]G$;

a function solving circuit part, by taking the for f(x) as a quadratic equation of $f(x) = ax^2+bx+c$, which should pass f(0), f(1), f(0.5) and satisfy the slope of f'(0.5), and solving coefficients of a, b, and, c, in two ranges of $0 \leq x < 0.5$ and $0.5 \leq x < 1$, so as to obtain the function f(x), being about symmetric to the middle point at 0.5; and a scaling circuit part, to obtain the output data at the desired point x, based on the solved function f(x), so that the output data are used in an application unit to display or analyze.

7. The apparatus of claim 6, wherein the function f(x) is chosen as $f(x) = 2[DG+f(0)-f(1)]x^2+[2f(1)-2f(0)-DG]x+f(0)$ for $0 \leq x < 0.5$ and $f(x) = -2[DG+f(0)-f(1)]x^2+[2f(0)-2f(1)+3DG]x+[f(1)-DG]$ for $0.5 \leq x < 1$.

8. The apparatus of claim 7, wherein the initial conditions satisfy the following relations:

for $0 \leq x < 0.5$: $f(0) = c$ $f(0.5) = a+b = [f(1)-f(0)]G = DG$ $f(0.5) = 0.25a+0.5b+c = 0.5[f(0)+f(1)] = M;$ and for $0.5 \leq x < 1$ $f(1) = a+b+c$ $f'(0.5) = a+b = [f(1)-f(0)]G = DG$ $f(0.5) = 0.25a+0.5b+c = 0.5[f(0)+f(1)] = M.$

9. The apparatus of claim 7, further comprising performing a Z transformation on the x coordinate into the z coordinate, wherein the Z transformation is $Z(z) = X(x)-0.5$, and $F(z) = 2[f(0)-f(1)+DG]z^2+(DG)z+0.5[f(0)+f(1)]$ for $-0.5 \leq z < 0$, that is, $0 \leq x < 0.5$; and $F(z) = 2[f(1)-f(0)-DG]z^2+(DG)z+0.5[f(0)+f(1)]$ for $0 \leq z < 0.5$, that is, $0.5 \leq x < 1$.

10. The apparatus of claim 9, wherein the initial conditions satisfies:

for $-0.5 \leq z < 0$, $F(0) = c = M = 0.5[f(0)+f(1)],$ $F'(0) = b = [f(1)-f(0)]G = DG,$ $F(-0.5) = 0.25a-0.5b+c = f(0);$ for $0 \leq z < 0.5$, $F(0) = c = M = 0.5[f(0)+f(1)],$ $F'(0) = b = [f(1)-f(0)]G = DG,$ $F(0.5) = 0.25a+0.5b+c = f(1).$

11. A method for generating destination data samples f(x) in response to two source data samples f(0) and f(1), the method is implemented in a scaling device to provide the destination data in display or analysis, wherein f(x) is generated for x in a range of $0 \leq x < 1$, said method comprising the steps of:

(a) generating a middle point sample f(0.5) by defining $f(0.5) = [f(0)+f(1)]/2$;

(b) fitting a quadratic equation of $f(x) = ax^2+bx+c$ to said source data samples f(0) and f(1) and said middle point sample f(0.5); and (c) generating a resulting equation $f(x) = 2[DG+f(0)-f(1)]x^2+(2f(1)-2f(0)-DG)x+f(0)$ for one subregion of $0 \leq x < 0.5$ and $f(x) = -2[DG+f(0)-f(1)]x^2+[2f(0)-2f(1)+3DG]x+[f(1)-DG]$ for another subregion of $0.5 \leq x < 1$, wherein DG designates a slope at said middle point sample f(0.5), wherein the resulting equation f(x) is used to generate the destination data samples in an application unit to display or analyze.

12. The method as claimed in claim 11, further comprising:

(d) converting $f(x) = 2[DG+f(0)-f(1)]x^2+(2f(1)-2f(0)-DG)x+f(0)$ one subregion of $0 \leq x < 0.5$ into $F(z) = 2[f(0)-f(1)+DG]z^2+(DG)z+0.5[f(0)+f(1)]$ for $-0.5 \leq z < 0$, and converting $f(x) = -2[DG+f(0)-f(1)]x^2+[2f(0)-2f(1)+3DG]x+[f(1)-DG]$ for said another subregion of $0.5 \leq x < 1$ into $F(z) = 2[f(1)-f(0)-DG]z^2+(DG)z+0.5[f(0)+f(1)]$ for $0 \leq z < 0.5$, wherein Z-transform of $Z(z) = X(x)-0.5$ is applied.

13. The method as claimed in claim 11, wherein D is defined to be $[f(1)-f(0)]$ and G is a gain factor.

* * * * *